United States Patent Office 3,427,035
Patented Feb. 11, 1969

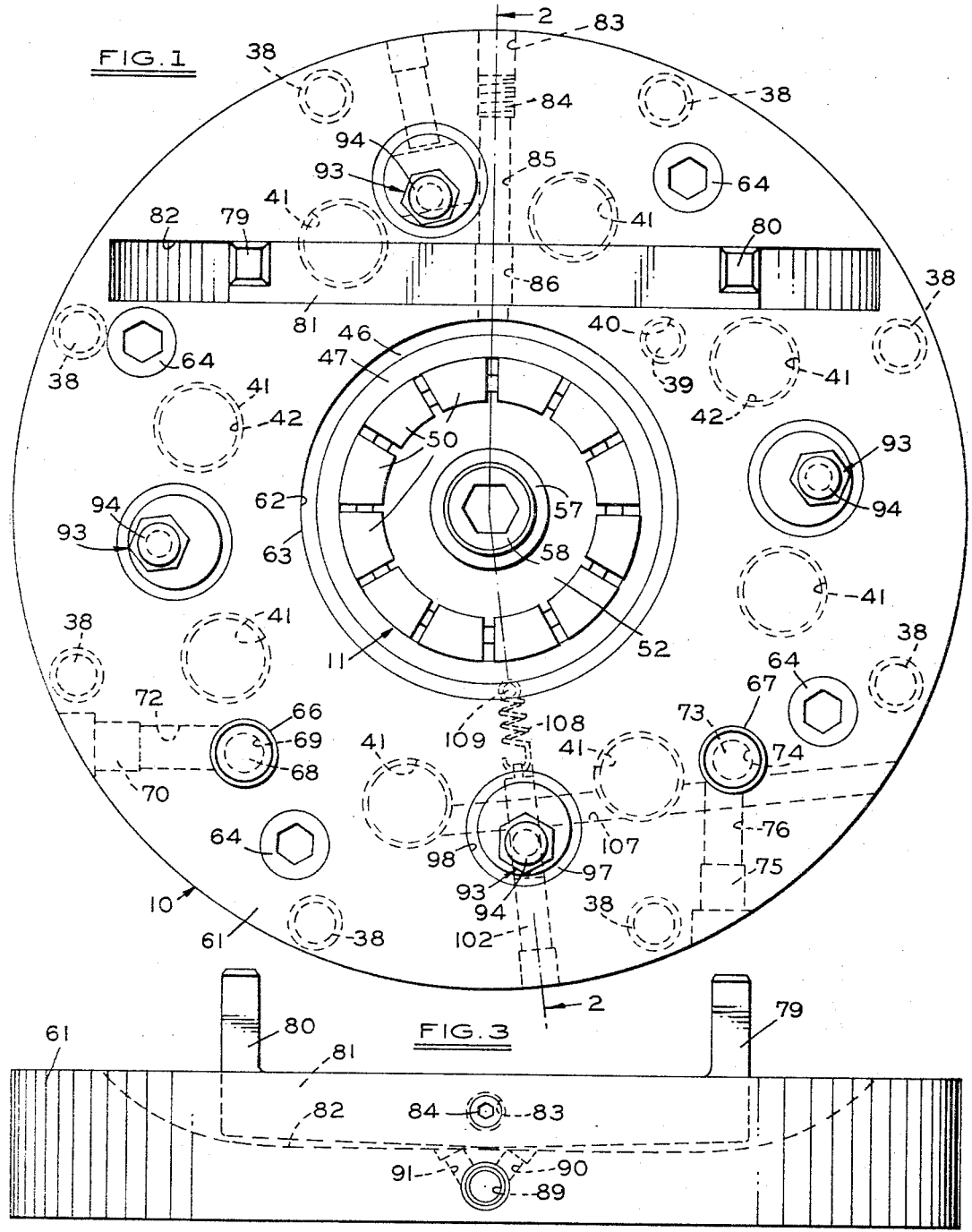

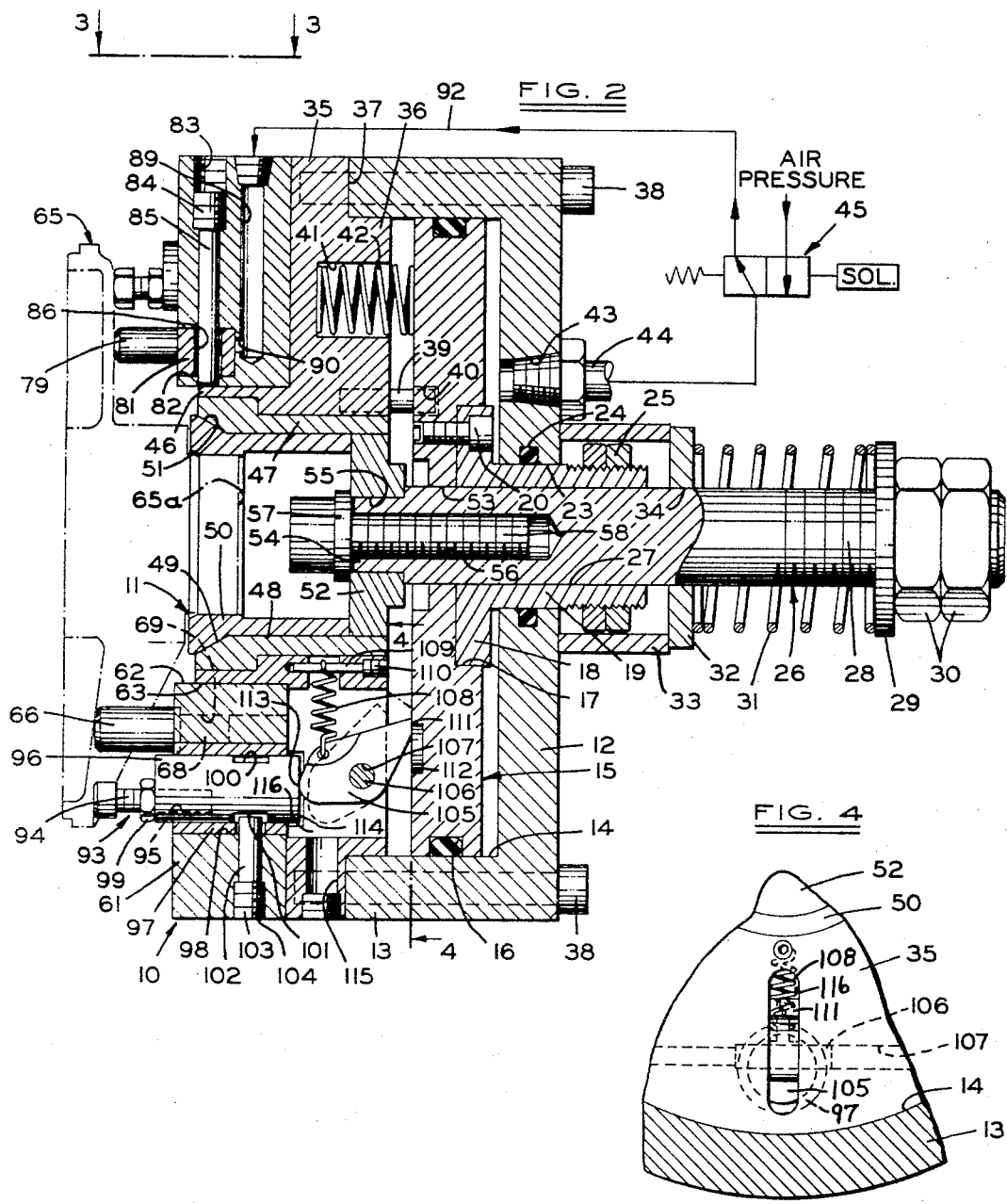

3,427,035
COLLET CHUCK FOR MACHINING
THIN WORKPIECES
Norman A. Heldt, Allen Park, Mich., assignor to
Ex-Cell-O Corporation, Detroit, Mich.
Filed July 13, 1965, Ser. No. 471,617
U.S. Cl. 279—4                                    4 Claims
Int. Cl. B23b 31/30, 31/12

ABSTRACT OF THE DISCLOSURE

A collet chunk means for supporting a workpiece having a relatively thin plate face in a manner to prevent deflection of the workpiece face while it is being machined. The collet chuck means includes a pair of locating pins and a pair of support pins pivotably mounted on a support arm and further includes a plurality of slidable support pins which are disposed radially in evenly spaced positions on the face of the collet chuck means.

---

This invention relates generally to the chuck art, and more particularly to a novel and improved collet chuck for machining thin, plate type workpieces.

It is an important object of the present invention to provide a novel and improved collet chuck for supporting a workpiece having a relatively thin plate face in a manner to prevent deflection of the workpiece face while it is being machined.

It is another object of the present invention to provide a novel and improved collet chuck for machining a thin faced workpiece having a boss for holding the workpiece, and which chuck can be employed in a machining operation wherein the chuck is stationary and a tool is rotatably mounted on a tool slide that moves the tool across the face of the stationary workpiece toward the centerline of the workpiece, or in a machining operation wherein the chuck is rotated and the tool is fixed on a movable tool slide that moves the tool across the face of the rotating workpiece to the centerline of the workpiece.

It is a further object of the present invention to provide a novel and improved collet chuck which is provided with a pair of fixed locating buttons and a pair of interconnected swingable locating buttons which coact to determine a plane of reference so that a thin faced, plate type workpiece may be quickly and easily mounted in the chuck with the face surface to be machined disposed parallel to the plane of the path of the tool which is to be moved over the face of the workpiece for machining the same.

It is another object of the present invention to provide a novel and improved collet chuck which is provided with a plurality of radially disposed workpiece support members, which are arranged in a circle around the centerline axis of the chuck, and which are each adapted to be cammed to a workpiece supporting position by a spring means and released from the workpiece supporting position by a pressurized fluid operated piston.

It is still a further object of the present invention to provide a novel and improved collet chuck which is provided with a swingably mounted workpiece locating apparatus provided with a passage means for the conduction of fluid under pressure to remove chips from the locating apparatus.

It is still another object of the present invention to provide a novel and improved collet chuck which is simple and compact in construction, economical of manufacture, and efficient in operation.

It is still a further object of the present invention to provide a novel and improved collet chuck which includes a housing, a collet means operatively mounted in said housing, a pressurized fluid operated piston mounted in the housing and connected to the collet means for moving the collet means to an open position, means for moving the collet to a closed work gripping position, workpiece locating means including a pair of fixed locating buttons and a pair of interconnected swingable locating buttons, and workpiece support means operatively mounted on said housing and movable into work supporting engagement with a workpiece when the collet is moved to the closed or workpiece gripping position.

Other objects, features and advantages of this invention will be apparent from the following detailed description, appended claims, and the accompanying drawings.

In the drawings:

FIG. 1 is a front elevational view of a collet chuck made in accordance with the principles of the present invention;

FIG. 2 is a slightly reduced, elevational section view of the structure illustrated in FIG. 1, taken substantially along the line 2—2 thereof, and looking in the direction of the arrows;

FIG. 3 is a partial top view of the front end of the collet chuck illustrated in FIG. 3, taken along the line 3—3 thereof, and looking in the direction of the arrows; and, FIGURE 4 is a fragmentary, elevational section view of the structure illustrated in FIG. 2, taken along the line 4—4 thereof, and looking in the direction of the arrows.

Referring now to the drawings, and in particular to FIGS. 1 and 2, wherein is shown an illustrative embodiment of the invention, the numeral 10 generally designates an annular housing in which is operatively mounted a collet means generally indicated by the numeral 11. The housing 10 may be fixed to a suitable support frame when it is desired to use the chuck as a stationary chuck for coaction with a rotating tool mounted on a tool slide adapted to feed the rotating tool toward the centerline of a stationary workpiece during a machining operation. It will be seen that the housing 10 may also be rotatably mounted on a suitable support frame for a machining operation on a workpiece wherein a tool is fixed on a tool slide which may be fed towards the centerline of a rotating workpiece during the machining operation.

As shown in FIG. 2, the chuck housing 10 includes the vertical rear end wall 12 from which is extended forwardly the integral, annular side wall 13 to form the piston cylinder 14. Slidably mounted in the chamber 14 is a plate-like circular piston, generally indicated by the numeral 15, which is provided with the peripheral O-ring sealing means 16. The piston 15 is provided on the rear face thereof with a centrally disposed, inwardly extended circular recess 17 in which is seated the flange 18 which is integral with the front end of a bushing or tubular piston rod 19. The flange 18 is secured to the piston 15 by any suitable means, as by a plurality of screws 20. The tubular piston rod 19 extends rearwardly through the bore 23 formed through the housing rear end wall 12. Operatively mounted in the peripheral wall of the bore 23 in the rear end wall 12 is a suitable O-ring sealing means indicated by the numeral 24. The rear end of the tubular piston rod 19 is threaded for the mounting thereon of a pair of threaded nuts 25 which may be adjusted axially or lengthwise of the piston rod 19 and locked against each other to form a stop means to limit the forward movement of the piston 15.

The collet 11 is adapted to be moved to the open position, to the left as viewed in FIG. 2, by the pressurized fluid operated piston 15, as explained more fully hereinafter. The collet 11 is movable to the right, as viewed in FIG. 2, to a closed or work gripping position by a draw bar or rod, generally indicated by the numeral 26. The draw bar 26 is mounted through the bore 27 of the tubular piston rod 19 and is fixed thereto by any suitable means, as by a suitable lock key means (not shown). The rear end of the draw rod 26 is threaded, as indicated by the numeral 28, and has mounted thereon the washer 29 and a pair of lock nuts 30. As shown in FIG. 2, a coil spring 31 is mounted around the rear end of the draw bar 26 and has the rear end thereof abutting the washer 29 and the front end thereof abutting a circular stop plate 32 which is fixedly mounted on the rear end of a cylindrical frame member 33. The cylindrical frame member 33 is fixed to the outer side of the housing rear wall 12 by any suitable means, as by welding, and it encircles the piston stop nuts 25. The stop plate 32 is provided with an axial hole 34 through which is slidably mounted the rear end of the draw bar 26. It will be seen that the spring 31 functions to normally bias or move the draw bar 26 to the collet closing position shown in solid lines in FIG. 2.

As shown in FIG. 2, the housing 10 further includes the annular cylinder head plate 35 which encloses the front end of the cylinder 14. The cylinder enclosure plate 35 is provided with a reduced diameter projection 36 on the rear side thereof which is adapted to be slidably mounted into the front end of the cylinder 14. The front end of the cylinder wall 13 is adapted to be seated on the shoulder 37 on the cylinder enclosure plate 35 and to be secured thereto by any suitable means, as by a plurality of screws 38. The cylinder enclosure plate 35 is provided with a dowel pin 39 which is fixed in a suitable hole on the rear face of the plate 35 and which extends rearwardly into a mating guide hole 40 formed in the front face of the piston 15. The dowel pin 39 functions to prevent the piston 15 from rotating in the cylinder 14.

The piston retraction spring 31 is assisted in its function by a plurality of springs 42 which are radially disposed about the centerline axis of the chuck, as shown in FIG. 1. The springs 42 are disposed in a circle in individual holes 41 formed in the rear side of the cylinder enclosure head plate 35. As illustrated in FIG. 2, the rear end of the springs 42 abut the front face of the piston 15. The springs 42 are compressed when the piston 15 is moved forwardly by pressurized fluid, and they assist the spring 26 in moving the piston 15 rearwardly during a collet closing operation.

Fluid under pressure is supplied to the cylinder 14 for moving the piston 15 to the left, as viewed in FIG. 2, to the collet open position by the following described structure. As shown in FIG. 2, a port 43 is formed through the housing rear wall 12, and in this port is threadably mounted one end of a supply tube 44. The tube 44 is shown schematically as being connected to a suitable three-way air flow control valve, generally indicated by the numeral 45, which is connected to a suitable source of air under pressure. The valve 45 is illustrated as being of the type which is solenoid operated in one direction and spring operated in the other direction. Any suitable three-way valve may be used. Any conventional controls may also be used for energizing the valve solenoid either manually or automatically.

As best seen in FIG. 2, the cylinder head plate 35 is provided with a forwardly extended reduced front hub 46 through which is formed a stepped bore in which is mounted the collet contracting sleeve 47. The sleeve 47 is mounted in the stepped bore in the hub 46 by any suitable means, as by a press fit. The collet contracting sleeve 47 is provided with an axial bore 48 through which is slidably mounted the collet means 11. The outer end of the sleeve bore 48 is tapered to provide a conical inner end surface on which is slidably seated the tapered or conical peripheral surfaces 51 of the collet fingers 50.

As best seen in FIG. 1, the collet fingers 50 are radially disposed about the centerline of the chuck and are fixed, by any suitable means, at the rear ends thereof to the front side of the annular collet base plate 52. As shown in FIG. 2, the collet base plate 52 is slidably mounted in the bore 48 of the collect contracting sleeve 47. The collet fingers 50 are so formed and attached to the base plate 52 whereby when the collet means 11 is moved to the left to the solid line position shown in FIG. 2, the fingers 50 will spring radially outwardly to an open position for the reception of a workpiece within the collet fingers 50.

The draw bar 26 is fixed to the collet means 11 by the following described structure shown in FIG. 2. The front end of the draw bar 26 passes through the bore 53 formed in the piston 15 and then extends forwardly so that its reduced diameter front end 54 is seated in the axial bore 55 formed through the collet base plate 52. The collet base plate 52 is detachably secured to the front end of the draw bar 26 by the screw 58 which is threaded into the axial hole 56 that extends inwardly from the front end of the bar 26. A suitable washer 57 is seated between the head of the screw 58 and the front surface of the collet base plate 52.

As shown in FIGS. 1 and 2, a circular face plate 61 is mounted on the front end of the cylinder head plate 35. The face plate 61 is provided with the axial bore 62 which is slidably mounted over and seated on the circular shoulder 63 formed on the reduced front hub 46. As shown in FIG. 1, the face plate 61 is fixedly secured to the cylinder head plate 35 by a plurality of screws 64.

The collet chuck of the present invention is adapted to machine a thin faced workpiece such as the end plate of a motor which has a plate portion and a hub attached thereto. A typical workpiece of the type adapted to be held by the collet chuck of the present invention is shown in FIG. 2 in broken lines and is indicated by the numeral 65. The numeral 65a indicates the workpiece boss or hub which is adapted to be gripped or clamped by the collet fingers 50 of the chuck. The collet chuck of the present invention is provided with a locating means which is adapted to locate or orientate the face on the plate portion of the workpiece 65 in a plane parallel to the plane or path of the machining tool which is to be operated across the face of the workpiece towards the centerline thereof. As shown in FIG. 1, the locating means includes a pair of laterally spaced apart pins 66 and 67 which are spaced downwardly from the centerline of the chuck and on opposite sides thereof. As shown in FIGS. 1 and 2, the locating pin 66 extends forwardly from the front end of the annular face plate 61 and is adapted to abut against the face of the plate portion of the workpiece 65 which is opposite to the face which is to be machined. The inner end of the pin 66 is reduced and it is adapted to be slidably mounted in a suitable hole in the annular face plate 61. In FIG. 2 the reduced portion of the pin 66 is indicated by the numeral 68 and the pin mounting hole is indicated by the numeral 69. As shown in FIG. 1, a retainer screw 70 is threadably mounted in the hole 72 which is formed laterally through the annular face plate 61 so as to permit the inner end of the screw 70 to bear against the pin reduced portion 68 and lock it in any desired adjusted position.

The locating pin 67 is adjustably secured in the face plate 61 by a similar arrangement. As shown in FIG. 1, the reduced inner end 73 of the pin 67 is slidably mounted in the bore 74 and is retained in adjusted position therein by means of the screw 75 which is threadably mounted in the bore 76.

As best seen in FIGS. 1 and 3, the locating means further includes a pair of swingably mounted orientating or locating pins 79 and 80. The pins 79 and 80 are integral with the ends of a bar or arm 81 which is pivotally mounted in the cross slot 82 formed in the outer face of the annular face plate 61. The arm 81 is formed in the shape of a plate with parallel upper and lower sides which are slidably engaged with the upper and lower parallel surfaces of the cross slot 82. The arm 81 is pivotally mounted in the cross slot 82 by the rod 85 which extends through the bore 86 formed through the arm 81 at a central point thereof. As shown in FIG. 2, the rod 85 has an enlarged head 84 which is threaded and is threadably mounted in the threaded hole 83.

As viewed in FIG. 1, the swingably mounted locating pins 79 and 80 are laterally spaced apart and on opposite sides of the centerline of the chuck as compared to the position of the fixed locating pins 66 and 67. The locating pins 66, 67, 79 and 80 are arranged in a substantially rectangular arrangement. As viewed in FIG. 2, the pins 66 and 79 are vertically aligned and the pins 67 and 80 are vertically aligned. In a fixed or stationary type of chuck the fixed locating pins 66 and 67 would be disposed as shown in FIG. 1 in a lower position. The swingably mounted locating pins 79 and 80 would be located in the upper position. It will be understood that in such a stationary chuck a different pressurized air inlet would have to be provided as, for example, the air inlet could be inserted into the cylinder 14 by means of a hollow or tubular draw bar 26.

The swingably mounted locating pin means 79 through 86 is provided with a chip removal means, as shown in FIGS. 2 and 3. A passage 89 is bored into the outer periphery of the annular base plate 61 in a position radially aligned with the bore 83 which holds the pivot pin 85. The outer end of the bore 89 is threaded for the reception of a suitable tube for conducting the pressurized exhaust air from the three-way solenoid flow control valve 45. As shown in FIG. 2, the exhaust outlet for the valve 45 is connected by means of a suitable tube, schematically indicated by the numeral 92, to the outer end of the bore 89. As shown in FIGS. 2 and 3, the inner end of the bore 89 is connected by a pair of outwardly extended passages 90 and 91 with the inner end of the cross slot 82. It will be seen that every time the pressurized air is released from the cylinder 14 during a workpiece gripping or clamping operation, the air exhausted from the cylinder 14 would be directed by the valve 45 through the bore 89 and into the cross slot 82 to blow out any chips which may have worked their way into the cross slot 82 during a previous machining operation.

The collet chuck of the present invention includes a workpiece backup or support means comprising a plurality of movably mounted pins indicated by the numeral 93 in FIG. 1. The support pins 93 are radially disposed relative to the centerline of the chuck and are arranged on a circle in evenly spaced positions. The support pins 93 are all structurally mounted in the same manner in the annular face plate 61, and the detailed construction of one of these pins is shown in FIG. 2.

As shown in FIG. 2, each of the support pins 93 comprises a stud 94 which is threadably mounted in a threaded hole 95 in a cylindrical stub shaft 96. The threaded hole 95 is mounted in an off center position relative to the axis of the shaft 96 to provide an eccentric mounting of the stud 94. The shaft 96 is slidably and rotatably mounted in the bore of a bushing 97 which is fixed, as by a press fit, in the bore 98 formed in the annular face plate 61. The stud 94 may be threadably adjusted inwardly and outwardly so as to bring the head of the stud into engagement with the rear side of the workpiece 65 for supporting the same during a machining operation. The stud 94 is locked in a desired adjusted position by means of a lock nut 99. The shaft 96 is provided with a pair of diametrically opposed flat surfaces 100 and 101 formed in the outer periphery of the shaft 96. The shaft 96 is prevented from being rotated in the bushing 97 by means of the limit rod 102 which has the threaded rod head 103 threadably mounted in the outer threaded end of the bore 104. As shown in FIG. 2, the flat surfaces 100 and 101 are longer than the diameter of the inner end of the rod 102 to permit axial or endwise movement of the shaft 96 in the bushing 97, as explained hereinafter.

As shown in FIG. 2, each of the support pin shafts 96 are adapted to be moved forwardly into engagement with the rear side of the workpiece 65 by a cam 105 which is pivotally mounted in a suitable recess 116 formed in the cylinder head plate 35. As shown in FIGS. 2 and 4, the cam 105 is pivotally mounted on a shaft 106 which is mounted in the bore 107 by any suitable means as, for example, by threading the shaft 106 into position. The recess 116 communicates with the sleeve 97 to permit the forward end 113 of the cam 105 to engage the rear end of the shaft 96.

When the air under pressure is released from the cylinder 14 and piston 15 is in the position shown in FIG. 2, the cam 105 is rotated clockwise because of bias of spring 108, as viewed in FIG. 2, so as to bring the front end 113 into engagement with the shaft 96 and move the stud 94 into engagement with the back of the workpiece 65. The cam 105 is normally rotated to move the shaft 96 forwardly by means of the spring 108 which has the upper end thereof fixed to the axially disposed pin 109. The pin 109 has the threaded head 110 so as to secure the pin in position. The lower end of the spring 108 is connected to the cam 105 as shown in FIG. 2. The rear end of the cam 105 is indicated by the numeral 111 and it abuts the wear plate 112 mounted in the face of the piston 15. When the piston 15 is in the position shown in FIG. 2, the workpiece boss 65a is clamped in the closed collet fingers 50 and the spring 108 pivots the cam 105 to the solid line position shown in FIG. 2 so that the front end 113 of the cam engages the back end 114 of the shaft 96 to move the stud 94 into supporting engagement with the back of the workpiece 65. The point of engagement between the cam front end 113 and the rear end 114 of the shaft 96 is slightly below the centerline of the cam pivot pin 106 to provide an efficient locking action when in the position shown in FIG. 2, yet permit the cam to be released when the piston 15 moves inwardly or to the left as viewed in FIG. 2. When the piston 15 is moved inwardly to the collet open position, the front end of the piston pushes the rear end 101 of the cam forwardly and pivots the cam to the dotted line position shown in FIG. 2 to permit the studs 94 to slide inwardly and release the support on the back of the workpiece 65.

As shown in FIG. 2, the space between the rear side of the cylinder head plate 35 and the front end of the piston 15 is open to the atmosphere through the cylinder exhaust passage 115 which communicates with one of the recesses 116 which in turn communicates with the space between the head plate 35 and the piston 15.

In use, the controls for the valve 45 would first be actuated to admit air under pressure into the cylinder 14 to move the piston 15 of the illustrative stationary chuck inwardly, or to the left as viewed in FIG. 2, to move the collet fingers 50 to the left and permit them to spring radially outwardly. The inward movement of the piston 15 rotates the cams 105 to the dotted line positions shown in FIG. 2 to release the support pins 94. A workpiece 65 is then mounted with the boss 65a inside of the collet fingers 50 and with the lower side in engagement with the locating pins 66 and 67. The upper side or end is then moved against the swingable mounted locating pins 79 and 80, to position the outer or back face of a workpiece substantially normal to the axis of the workpiece, in a plane which is substantially parallel to the plane of the cutting edge of the machine tool. The controls for the valve 45 are then actuated to release the air under pressure in the cylinder 14 and permit the springs 31 and 42 to move the piston 15 rearwardly to the solid line position shown in FIG 2. The collet fingers 50 will then be cammed inwardly by the inclined annular or ring surface 49 into a workpiece gripping or clamping position against the boss 65a. The springs 108 will then rotate the cams 105 so as to move the shafts 96 and the studs 94 into engagement with the rear face of the workpiece 65 to support the workpiece and prevent it from distorting during a machining operation. It will be understood that the support pin shafts 96 may be rotated 180° when the rods 102 are threaded outwardly to permit the inner ends of the rods 102 to engage the flat surfaces 100 for smaller diameter workpieces. It will also be understood that the position of the studs 94 will be adjusted for each particular type of workpiece and that once they are adjusted they will be operative for an entire group of similar workpieces. The lower locating pins 66 and 67 are also adjusted inwardly and outwardly to the proper position for a particular type of workpiece and then they are locked in position and need not be changed for the succeeding similar type workpieces.

While it will be apparent that the preferred embodiment of the invention herein disclosed is well calculated to fulfill the objects above stated, it will be appreciated that the invention is susceptible to modification variation and change without departing from the proper scope or fair meaning of the subjoined claims.

What I claim is:
1. In a collet chuck, the combination comprising:
  (a) a housing;
  (b) a collet means operatively mounted in said housing for gripping a workpiece;
  (c) a pressurized fluid operated piston movably mounted in said housing and connected to said collet means and adapted to move to an open position for the insertion of a workpiece therein;
  (d) locating means mounted on said housing for locating the back surface of a workpiece when it is mounted on said chuck substantially parallel to the plane of travel of the cutting edge of a machining tool, and normal to the axis of said workpiece;
  (e) support means operatively mounted on said housing and movable to an inoperative position when said collet means is moved to an open position and to an operative position when said collet means is moved to a closed or workpiece gripping position;
  (f) said support means comprises a plurality of support pins disposed parallel to the axis of said chuck and in a circular arrangement about the axis of said chuck;
  (g) each of said support pins adapted to be moved into supporting engagement with the back surface of said workpiece by a cam means when said collet means is moved into said workpiece gripping position;
  (h) each of said cam means adapted to be moved in one direction to actuate each of said support pins into engagement with said back surface of said workpiece to provide a workpiece supporting means;
  (i) said fluid operated piston adapted to move each of said cam means in the other direction to disengage each of said support pins from said workpiece; and
  (j) means for moving said collet means to a closed position for gripping said workpiece or an open position for releasing said workpiece.
2. The collet chuck as defined in claim 1, wherein:
  (a) each of said adjustable pins is mounted in a shaft disposed parallel to the axis of the chuck; and,
  (b) the respective cam means for each support pin is pivotally mounted and has one end engageable with the rear end of the support pin shaft and the other end engageable with said fluid operated piston.
3. The collet chuck as defined in claim 2, wherein:
  (a) each of said support pins is eccentrically mounted in its respective shaft; and,
  (b) each supporting pin shaft is rotatable to selected adjusted positions for supporting workpieces of different sizes.
4. In a collet chuck, the combination comprising:
  (a) a housing;
  (b) collet means operatively mounted in said housing for gripping a workpiece;
  (c) said collet means including a draw bar;
  (d) a pressurized fluid operated piston mounted in said housing and connected to said draw bar, said piston adapted for moving said collet means to an open position for the insertion of a workpiece therein;
  (e) a plurality of locating pins mounted on said housing for locating the back surface of said workpiece when it is mounted on said chuck wherein said plurality of locating pins includes;
    (1) a pair of fixed, spaced apart locating pins, and,
    (2) a pair of spaced apart, swingably mounted pins, which are also spaced apart from said first pair of locating pins;
  (f) a plurality of support pins operatively mounted on said housing and movable to an inoperative position when said collet means is moved to an open position and to an operative position when said collet is moved to a closed position wherein said plurality of support pins includes;
    (1) said plurality of support pins are moved into a workpiece supporting positions by a spring biased swingably mounted cam means; and
    (2) said piston is adapted to engage said cam means when said piston moves said collet means to the open position to release said support pins from the workpiece supporting positions; and
  (g) spring means for moving said collet means to a closed position for gripping said workpiece.

References Cited

UNITED STATES PATENTS

| | | | |
|---|---|---|---|
| 3,163,433 | 12/1964 | Ross. | |
| 3,143,356 | 8/1964 | Pray | 279—4 |
| 2,910,301 | 10/1959 | Mann | 279—4 |
| 2,500,383 | 3/1950 | Sadler | 279—4 |
| 804,513 | 11/1905 | Wright | 279—51 X |

ROBERT C. RIORDON, *Primary Examiner.*

R. V. PARKER, JR., *Assistant Examiner.*

U.S. Cl. X.R.

279—51